US006805635B1

United States Patent
Organ

(10) Patent No.: US 6,805,635 B1
(45) Date of Patent: Oct. 19, 2004

(54) RETAINER FOR UNIVERSAL JOINT BEARING CUPS

(75) Inventor: Charles D. Organ, Bowling Green, OH (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 10/334,105

(22) Filed: Dec. 30, 2002

(51) Int. Cl.[7] .............................................. F16D 3/26
(52) U.S. Cl. ........................................ 464/130; 403/12
(58) Field of Search ............................... 464/130, 901; 403/11, 12, 57, 74

(56) References Cited

U.S. PATENT DOCUMENTS

| | | | |
|---|---|---|---|
| 2,228,715 A | * | 1/1941 | Wollner ...................... 464/130 |
| 3,254,385 A | | 6/1966 | Van Horn, Sr. |
| 3,783,638 A | | 1/1974 | Doran et al. |
| 4,784,629 A | | 11/1988 | Jones |
| 5,000,609 A | | 3/1991 | Dutkiewicz et al. |

* cited by examiner

*Primary Examiner*—David Bagnell
*Assistant Examiner*—K. Thompson
(74) *Attorney, Agent, or Firm*—MacMillan, Sobanski & Todd, LLC

(57) ABSTRACT

A retainer for retaining a pair of bearing cups on an opposed pair of trunnions of a universal joint cross includes a strap having first and second end portions and an intermediate portion extending between the first and second end portions. The first and second end portions are adapted to be adhered to the pair of bearing cups on the pair of trunnions of the cross. The first and second end portions are adapted to be adhered to the pair of bearing cups by first and second adhesive elements. The retainer prevents the bearing cups from becoming lost during shipment. When the cross is received at a second manufacturing location, the retainer can be quickly and easily removed, without the use of any tools.

20 Claims, 4 Drawing Sheets

RETAINER FOR UNIVERSAL JOINT BEARING CUPS

BACKGROUND OF THE INVENTION

This invention relates to an improved structure for quickly, inexpensively, and reliably retaining a pair of bearing cups on an opposed pair of trunnions on a cross for a universal joint during shipment from one manufacturing location to another.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

Each of the universal joints typically includes a cross having a central body portion with four cylindrical trunnions extending outwardly therefrom. The trunnions are oriented in a single plane and extend at right angles relative to one another. A hollow cylindrical bearing cup is mounted on the end of each of the trunnions. Needle bearings or other friction-reducing structures are provided between the outer cylindrical surfaces of the trunnions and the inner cylindrical surfaces of the bearing cups to permit rotational movement of the bearing cups relative to the trunnions during operation of the universal joint. In the front universal joint of the above-described driveshaft assembly, the bearing cups supported on the first opposed pair of the trunnions on a front cross are connected to the front end fitting of the driveshaft assembly, while the bearing cups supported on the second opposed pair of the trunnions on the front cross are connected to an end fitting secured to the output shaft of the engine/transmission assembly. Similarly, in the rear universal joint of the above-described driveshaft assembly, the bearing cups supported on the first opposed pair of the trunnions on a rear cross are connected to the rear end fitting of the driveshaft assembly, while the bearing cups supported on the second opposed pair of the trunnions on the rear cross are connected to an end fitting secured to the input shaft of the axle assembly.

Frequently, the driveshaft assembly (including the driveshaft tube, the front and rear end fittings, and the crosses for the front and rear universal joints) is assembled at a first manufacturing location, then shipped as a unit to a second manufacturing location for assembly with the other components of the vehicle drive train system. In such an assembly process, the bearing cups supported on the first opposed pairs of the trunnions on both the front and rear crosses are connected to the associated front and rear end fittings of the driveshaft assembly. However, the bearing cups supported on the second opposed pairs of the trunnions on the front and rear crosses are not positively retained thereon. As a result, these non-retained bearing cups can move apart from one another on the crosses, such as when the respective universal joints are purged with lubricant. Also, these non-retained bearing cups can be inadvertently removed from the crosses and become lost during shipment from the first manufacturing location to the second manufacturing location.

To address this, a variety of straps are known in the art for positively retaining these bearing cups on their associated crosses. However, known retainer straps have been found to be somewhat time-consuming to install and remove. Also, known retainer straps have been found to be relatively expensive. Lastly, in some instances, known retainer straps have been found themselves to become dislodged from the bearing cups during shipment. Accordingly, it would be desirable to provide an improved structure for quickly, inexpensively, and reliably retaining a pair of bearing cups on an opposed pair of trunnions on a cross for a universal joint during shipment from one manufacturing location to another.

SUMMARY OF THE INVENTION

This invention relates to an improved structure for quickly, inexpensively, and reliably retaining a pair of bearing cups on an opposed pair of trunnions on a cross for a universal joint. The improved structure of the invention is useful, for example, during shipment from one manufacturing location to another. The retainer includes a strap having first and second end portions and an intermediate portion extending between the first and second end portions. The first and second end portions are adapted to be adhered to the pair of bearing cups on the pair of trunnions of the cross. The first and second end portions are adapted to be adhered to the pair of bearing cups by first and second adhesive elements. The retainer prevents the bearing cups from becoming lost during shipment. When the cross is received at a second manufacturing location, the retainer can be quickly and easily removed.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
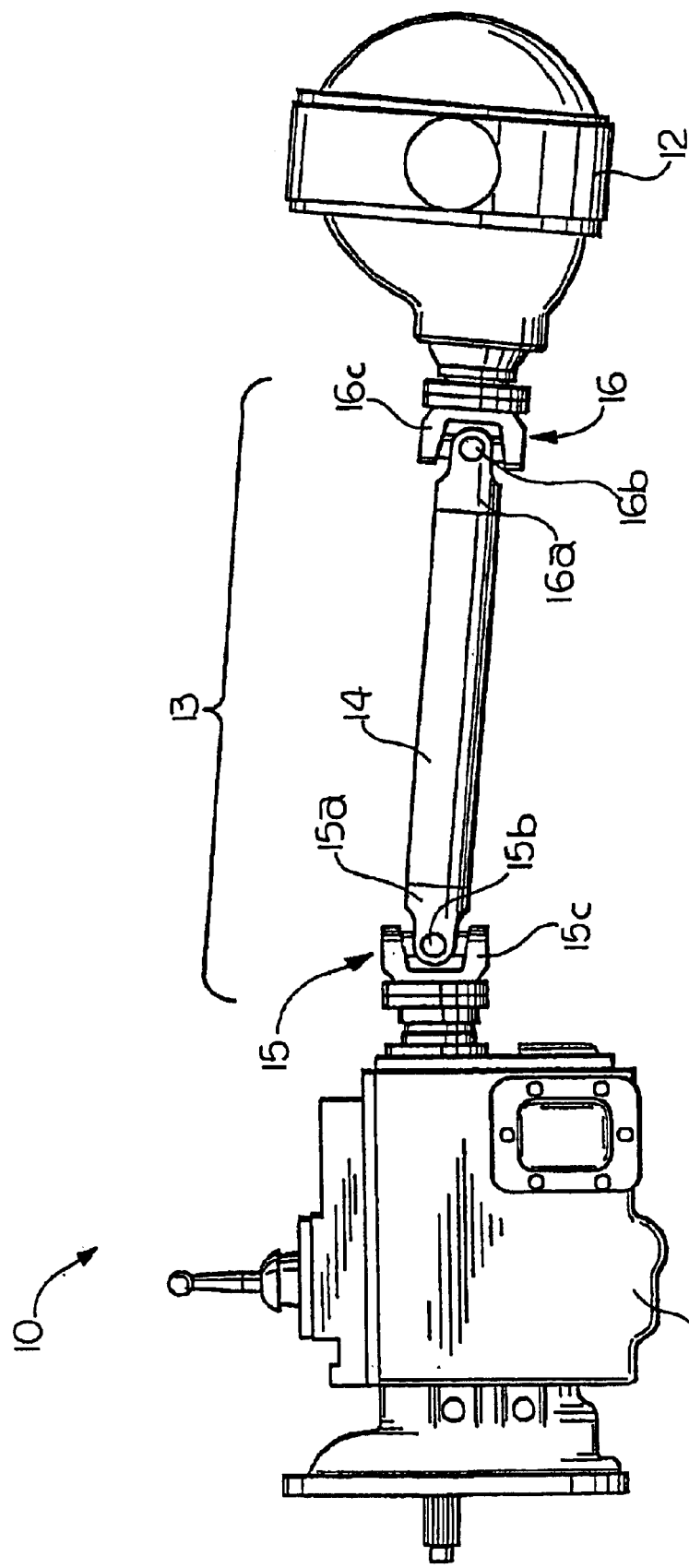
FIG. 1 is a side elevational view of a conventional vehicle drive train system including a driveshaft assembly.

Referring now to the drawings, there is illustrated in FIG. 1 a drive train system, indicated generally at 10, for a vehicle that is adapted to transmit rotational power from an engine/ transmission assembly 11 to a plurality of driven wheels (not shown). The illustrated drive train assembly 10 is conventional in the art and is intended merely to illustrate one environment in which this invention may be used. Thus, the scope of this invention is not intended to be limited for use with the specific structure for the vehicle drive train assembly 10 illustrated in FIG. 1 or to vehicle drive train assemblies in general. On the contrary, as will become apparent below, this invention may be used in any desired environment for the purposes described below.

The illustrated drive train system 10 includes a transmission 11 having an output shaft (not shown) that is connected to an input shaft (not shown) of an axle assembly 12 through a driveshaft assembly 13. The transmission 11 is rotatably driven by an engine (not shown) that generates rotational power in a conventional manner. The driveshaft assembly 13 includes a cylindrical driveshaft tube 14 having a center portion and a pair of opposed end portions. The output shaft of the transmission 11 and the input shaft of the axle assembly 12 are typically not co-axially aligned. To accommodate this, a pair of universal joints, indicated generally at 15 and 16, are provided to respectively connect the end portions of the driveshaft tube 14 to the output shaft of the transmission 11 and to the input shaft of the axle assembly 12. The first universal joint 15 includes a tube yoke 15a that is secured to the forward end portion of the driveshaft tube 14 by any conventional means, such as by welding. The first universal joint 15 further includes a cross 15b that is connected to the tube yoke 15a in a conventional manner. Lastly, the first universal joint 15 includes an end yoke 15c that is connected to the output shaft of the transmission 11 and to the cross 15b. Similarly, the second universal joint 16 includes a tube yoke 16a that is secured to the rearward end portion of the driveshaft tube 14 by any conventional means, such as by welding. The second universal joint 16 further includes a cross 16b that is connected to the tube yoke 16a in a conventional manner. Lastly, the second universal joint 16 includes an end yoke 16c that is connected to the cross 16b and to the input shaft of the axle assembly 12. The front and rear universal joints 15 and 16 provide a rotational driving connection from the output shaft of the transmission 11 through the driveshaft tube 14 to the input shaft of the axle assembly 12, while accommodating a limited amount of angular misalignment between the rotational axes of these three shafts.

Figure 2:
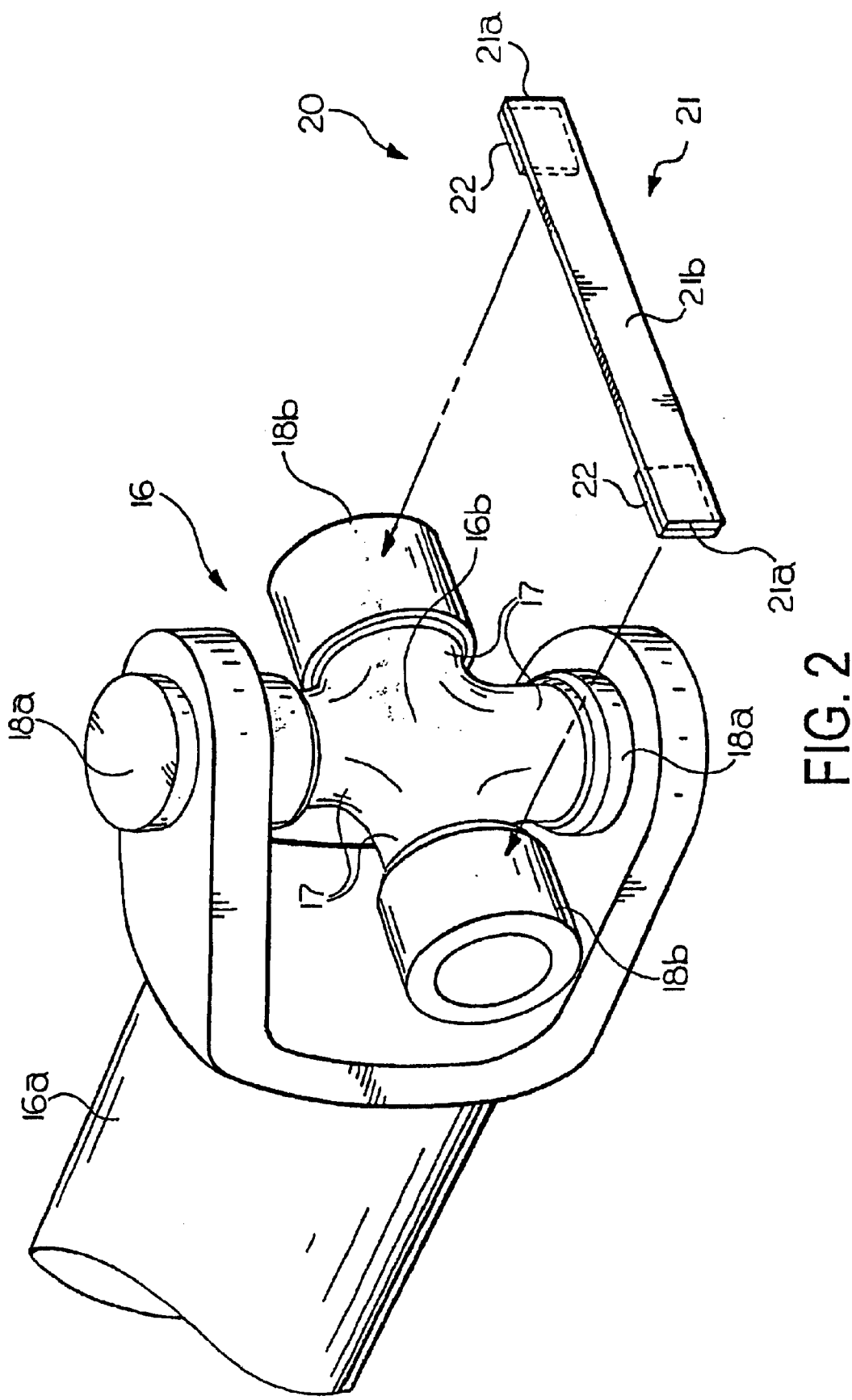
FIG. 2 is an exploded perspective view of an end of the driveshaft assembly illustrated in FIG. 1 and a bearing cup retainer in accordance with this invention shown prior to installation.
Figure 3:
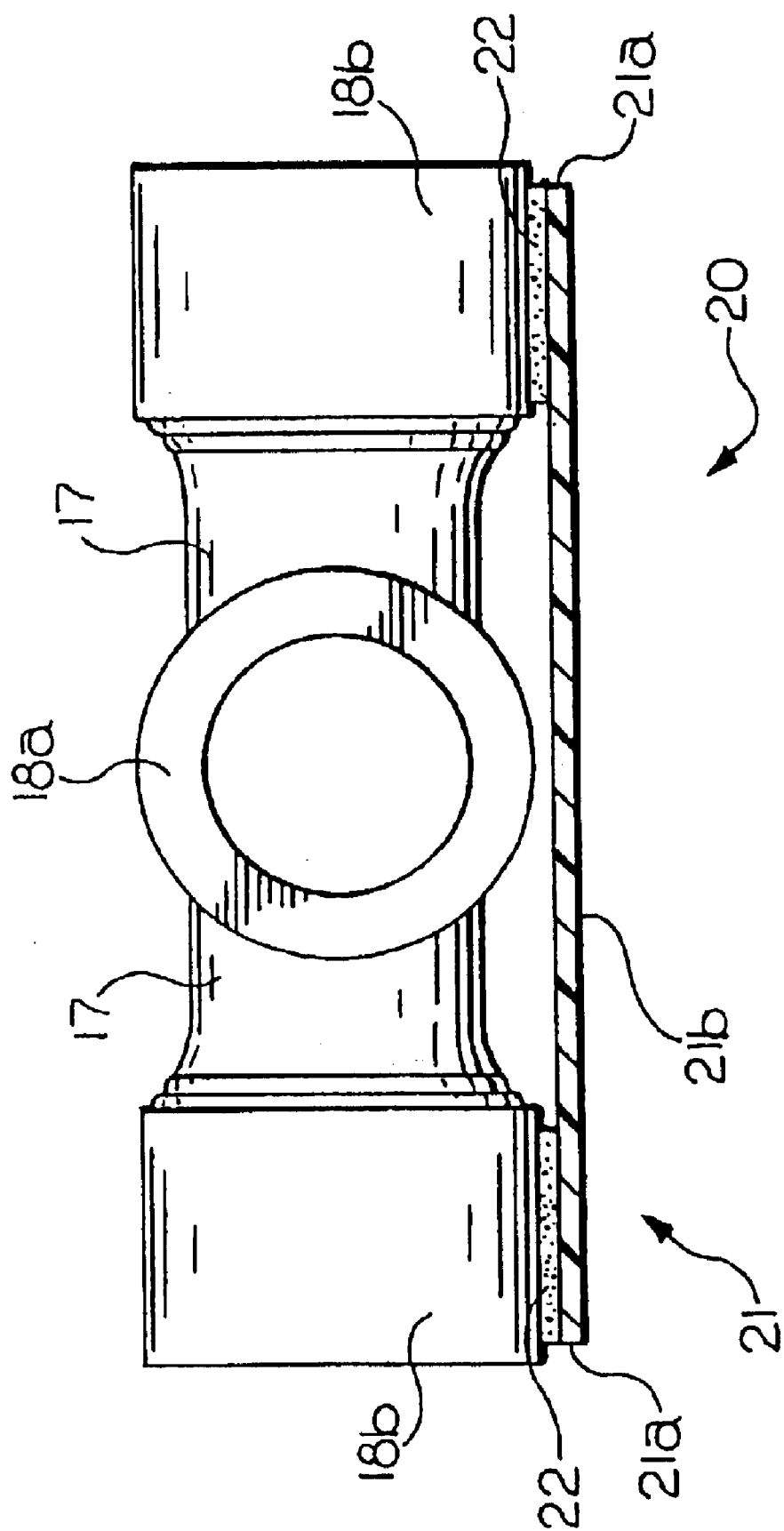
FIG. 3 is a sectional elevational view showing the bearing cup retainer installed on a cross supported on the end of the driveshaft assembly illustrated in FIG. 2.

The rear end of the driveshaft assembly 13 and a portion of the rear universal joint 16 are shown in detail in FIG. 2. As shown therein, the cross 16b of the rear universal joint 16 has a central body portion with four cylindrical trunnions 17 extending outwardly therefrom. The trunnions 17 are oriented in a single plane and extend at right angles relative to one another. A first pair of hollow cylindrical bearing cups 18a is mounted on the ends of a first opposed pair of the trunnions 17 of the cross 16b. A second pair of hollow cylindrical bearing cups 18b is mounted on the ends of a second opposed pair of the trunnions 17 of the cross 16b. Each of the bearing cups 18a and 18b is generally hollow and cylindrical in shape, including a circumferential side wall and an outer circular end wall. Needle bearings or other friction-reducing structures (not shown) are provided between the outer cylindrical surfaces of the trunnions 17 and the inner cylindrical surfaces of the bearing cups 18a and 18b to permit rotational movement of the bearing cups 18a and 18b relative to the associated trunnions 17 during operation of the universal joint 16b. The bearing cups 18a and 18b supported on the first opposed pair of the trunnions 17 on the rear cross 16b are connected to the tube yoke 16a that is secured to the rearward end portion of the driveshaft tube 14. However, the bearing cups 18b supported on the second opposed pair 18b of the trunnions 17 on the rear cross 16b are not positively retained thereon by themselves.

A retainer, indicated generally at 20, is provided for positively retaining the pair of bearing cups 18b on the associated trunnions 17 of the cross 16b, such as during shipment of the driveshaft assembly 13 from one manufacturing location to another, as described above. The retainer of the illustrated embodiment includes a strap 21 that has opposing end portions 21a and an intermediate portion 21b extending between the end portions 21a. The strap 21 is generally flat and rectangular in shape, although other shapes could also be used with the invention. An adhesive element 22 is supported by each of the end portions 21a of the strap 21. Each of the adhesive elements 22 can be in the form of an adhesive material supported directly on the end portions 21a of the strap 21. Alternatively, each of the adhesive elements 22 has two tacky sides. The tacky sides of each of the adhesive elements 22 face in opposing directions. One of the tacky sides of the adhesive elements 22 adheres to the end portions 21a of the strap 21. The other tacky side of the adhesive elements 22 adheres to the bearing cups 18b that are supported on the associated trunnions 17 of the cross 16b. The intermediate portion 21b of the strap 21 extends between the bearing cups 18b. The size of each of the adhesive elements 22 is largely dependent on the size of the cross 16b and the pressure exerted on the bearing cups 18b by lubricant or grease applied to the cross 16b. The adhesive composition of each of the adhesive elements 22 is preferably an oil-resistant adhesive composition, which is well known to those of ordinary skill in the art of the invention. The oil-resistant adhesive composition enables the adhesive elements 22 to maintain contact with the bearing cups 18b on the associated trunnions 17 of the cross 16b in the event lubricant escapes from the cross 16b. The size of the strap 21 depends largely on the size of the cross 16b and, more particularly, on the axial distance between the bearing cups 18b on the associated trunnions 17 of the cross 16b. According to a preferred embodiment of the invention, the length of the strap 21 and the size of each of the adhesive elements 22 should be sufficient to allow the adhesive elements 22 to contact a majority of the axial length of the circumferential side walls of the bearing cups 18b. The composition of the strap 21 is preferably plastic, though such is not necessary. For example, the strap 21 may be paper, metal, fiber, wire, including metal wire, or a textile material, as long as the tensile strength of the strap 21 and the bonding strength of the adhesive elements 22 are sufficient to firmly hold the bearing cups 18b on the associated trunnions 17 of the cross 16b under the pressure exerted by the lubricant applied to the cross 16b. However, the strap and the adhesive elements 22 should be sufficiently flexible or pliable so that the strap 21 and the adhesive elements 22 are capable of being shaped to conform to the shape or contour of the circumferential side walls of the bearing cups 18b on the associated trunnions 17 of the cross 16b.

Figure 4:
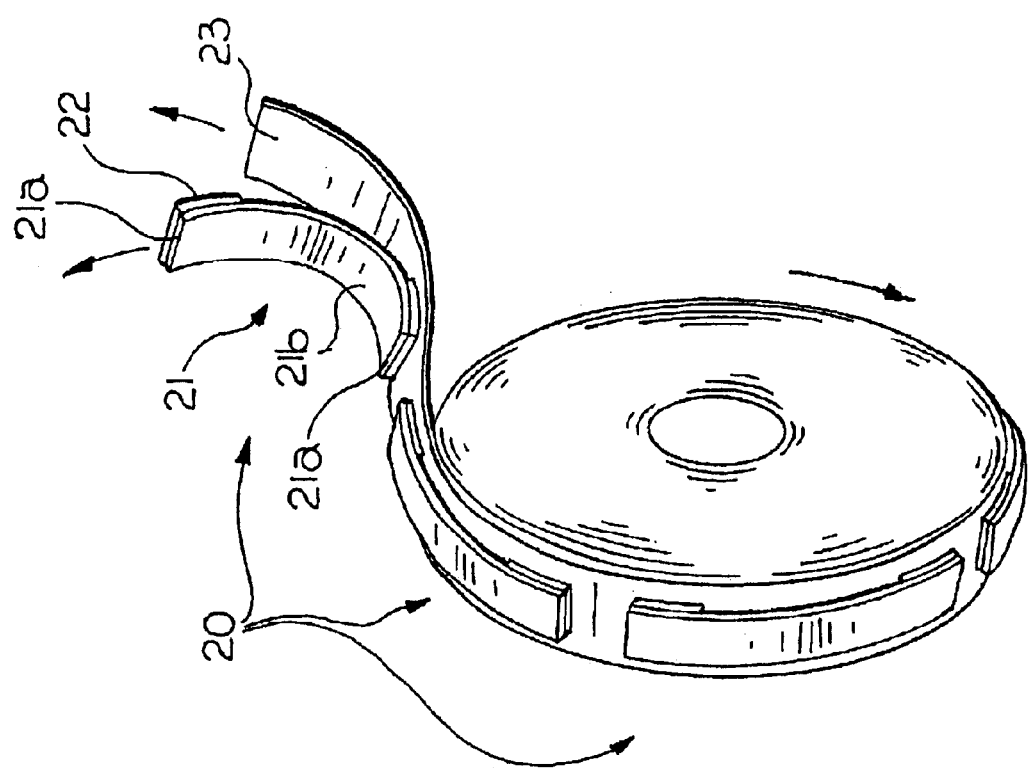
FIG. 4 is a perspective view showing a plurality of the bearing cup retainers, as illustrated in FIGS. 2 and 3, on a roll of release paper.

A plurality of retainers 20 according to the preferred embodiment of the invention may be prefabricated and packages by releasably adhering them to release paper. Each of the retainers 20 or each of the adhesive elements 22 can be independently adhered to an individual release paper. Alternatively, a plurality of retainers 20 can be adhered to a single roll of release paper, such as the roll of release paper 23 illustrated in FIG. 4. The release paper 23 can be in the form of a strip of paper having a wax coating applied thereto.

A plurality of retainers 20 according to the present invention can be releasably adhered to the wax coating. During the manufacture of the driveshaft assemblies 13, retainers 20 can be removed from the release paper 23 and quickly and easily applied to the bearing cups 18b on the associated trunnions 17 of the cross 16b, without the use of any tools. This permits a number of the driveshaft assemblies 13 to be easily and effortlessly prepared for shipment from one manufacturing location to another, as described above. It should be appreciated by one of ordinary skill in the art that adhesive elements 22 can be adhered to the bearing cups 18b and the straps 21 can be provided without adhesive elements. This would enable the straps 21 to be dispensed, for example, from a bin (not shown) and applied to the adhesive elements 22 on the bearing cups 18b.

During shipment of the driveshaft assemblies 13, the retainers 20 reliably retain the bearing cups 18b on the associated trunnions 17 of the crosses 16b and prevent the bearing cups 18b from being separated from the trunnions and inadvertently removed and lost. When the driveshaft assemblies 13 are received at a second manufacturing location, the retainers 20 can be quickly and easily removed, again without the use of any tools. Therefore, it can be seen that the use of the easily applied and removed adhesive elements 22 on the retainer 20 means that the retainer 20 is configured to be applied to the bearing cups 18b by hand, without the use of tools, and further the retainer 20 is configured to be removable from the bearing cups 18b by hand, without the use of tools. Lastly, the retainers 20 can be recycled, thus reducing the costs associated with providing the retainers 20.

Although the adhesive elements 22 have been described thus far as including an adhesive material, it is to be understood that the adhesive element can include any other means for adhering the end portions 21a of the strap 20 to the bearing cups 18b. For example, the adhesive element can be a pair of magnets (not shown), connected by a strap or wire, that adhere to the bearing cups 18b and retain the bearing cups 18b on the trunnions during transit of the universal joint cross.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A combined universal joint cross and retainer assembly comprising:
    a cross having a central body portion with a pair of trunnions extending outwardly therefrom;
    a pair of bearing cups respectively supported on said pair of trunnions, each of said bearing cups having a circumferential side wall; and
    a retainer for retaining said pair of bearing cups on said pair of trunnions, said retainer including a strap having first and second end portions and an intermediate portion extending between said first and second end portions, said first and second end portions being adhered only to said circumferential side walls of said pair of bearing cups on said pair of trunnions of said cross by first and second adhesive elements, respectively.

2. The combined universal joint cross and retainer assembly defined in claim 1 wherein said strap is generally flat and rectangular in shape.

3. The combined universal joint cross and retainer assembly defined in claim 1 wherein said strap is formed from plastic.

4. The combined universal joint cross and retainer assembly defined in claim 1 wherein said strap and said adhesive elements are shaped to conform to said bearing cups.

5. The combined universal joint cross and retainer assembly defined in claim 1 wherein said strap and said adhesive elements are pliable so as to be capable of being shaped to conform to said bearing cups.

6. The combined universal joint cross and retainer assembly defined in claim 1 wherein said strap and each of said adhesive elements are sized so that said adhesive elements contact a majority of an axial length of said bearing cups.

7. The combined universal joint cross and retainer assembly defined in claim 1 wherein each of said adhesive elements includes an oil-resistant adhesive.

8. The combined universal joint cross and retainer assembly defined in claim 1 wherein said retainer is configured to be applied to the bearing cups by hand, without the use of tools.

9. The combined universal joint cross and retainer assembly defined in claim 1 wherein said retainer is configured to be removable from the bearing cups by hand, without the use of tools.

10. A method for retaining a pair of bearing cups on a respective pair of trunnions of a universal joint cross, comprising the steps of:
    a) providing a cross having a central body portion with a pair of trunnions extending outwardly therefrom and a pair of bearing cups respectively supported on said pair of trunnions, each of said bearing cups having a circumferential side wall;
    b) providing a retainer having a strap extending with first and second end portions having respective first and second adhesive elements and an intermediate portion between the first and second end portions; and
    c) adhering the first and second adhesive elements only to the circumferential side walls of the pair of bearing cups on the pair of trunnions of the cross.

11. The method defined in claim 10 wherein said strap is generally flat and rectangular in shape.

12. The method defined in claim 10 wherein said strap is formed from plastic.

13. The method defined in claim 10 wherein said strap and said adhesive elements are shaped to conform to said bearing cups.

14. The method defined in claim 10 wherein said strap and said adhesive elements are pliable so as to be capable of being shaped to conform to said bearing cups.

15. The method defined in claim 10 wherein said strap and each of said adhesive elements are sized so that said adhesive elements contact a majority of an axial length of said bearing cups.

16. The method defined in claim 10 wherein each of said adhesive elements includes an oil-resistant adhesive.

17. The method defined in claim 10 wherein said retainer is provided from a package that includes a plurality of similar retainers adhered to a release paper.

18. The method defined in claim 17 wherein said release paper is in the form of a roll.

19. The method defined in claim 17 wherein said strap is generally flat and rectangular in shape, and wherein said strap is formed from plastic.

20. A method for retaining a pair of bearing cups on a respective pair of trunnions of a universal joint cross, comprising the steps of:

a) providing a cross having a central body portion with a pair of trunnions extending outwardly therefrom and a pair of bearing cups respectively supported on said pair of trunnions, each of said bearing cups having a circumferential side wall;

b) providing a retainer having a strap extending with first and second end portions having respective first and second adhesive elements and an intermediate portion between the first and second end portions, wherein said strap is generally flat and rectangular in shape, wherein said strap and said adhesive elements are pliable so as to be capable of being shaped to conform to said bearing cups, and wherein said retainer is provided from a package that includes a plurality of similar retainers adhered to a release paper; and c) adhering the first and second adhesive elements only to circumferential side walls of the pair of bearing cups on the pair of trunnions of the cross.

* * * * *